Figures 1, 2:
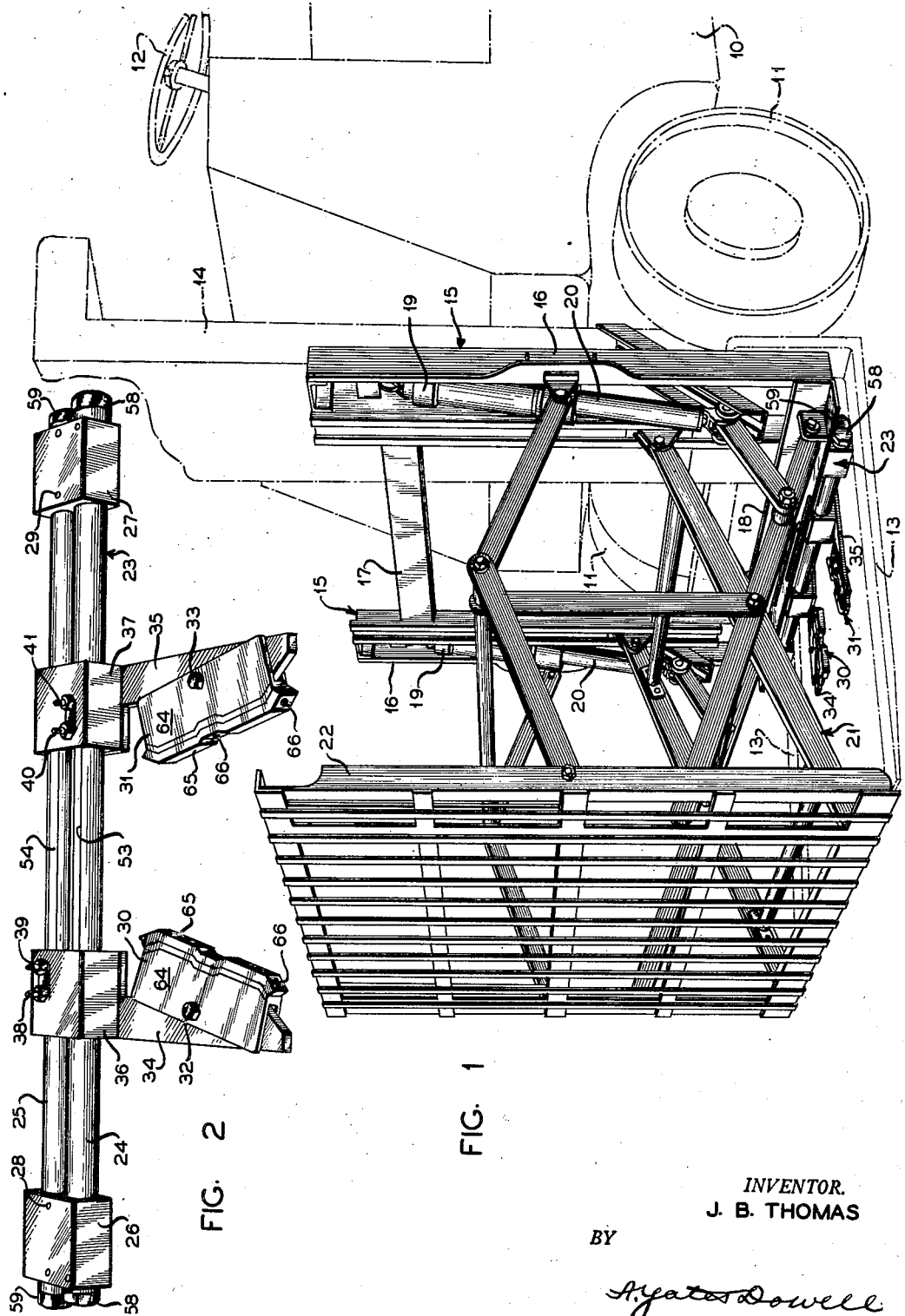

Oct. 20, 1953

J. B. THOMAS 2,656,062

PALLET GRIPPING DEVICE

Filed March 28, 1950

3 Sheets-Sheet 1

INVENTOR.
J. B. THOMAS
BY
A. Yates Dowell
ATTORNEY

Oct. 20, 1953  J. B. THOMAS  2,656,062
PALLET GRIPPING DEVICE
Filed March 28, 1950  3 Sheets-Sheet 2
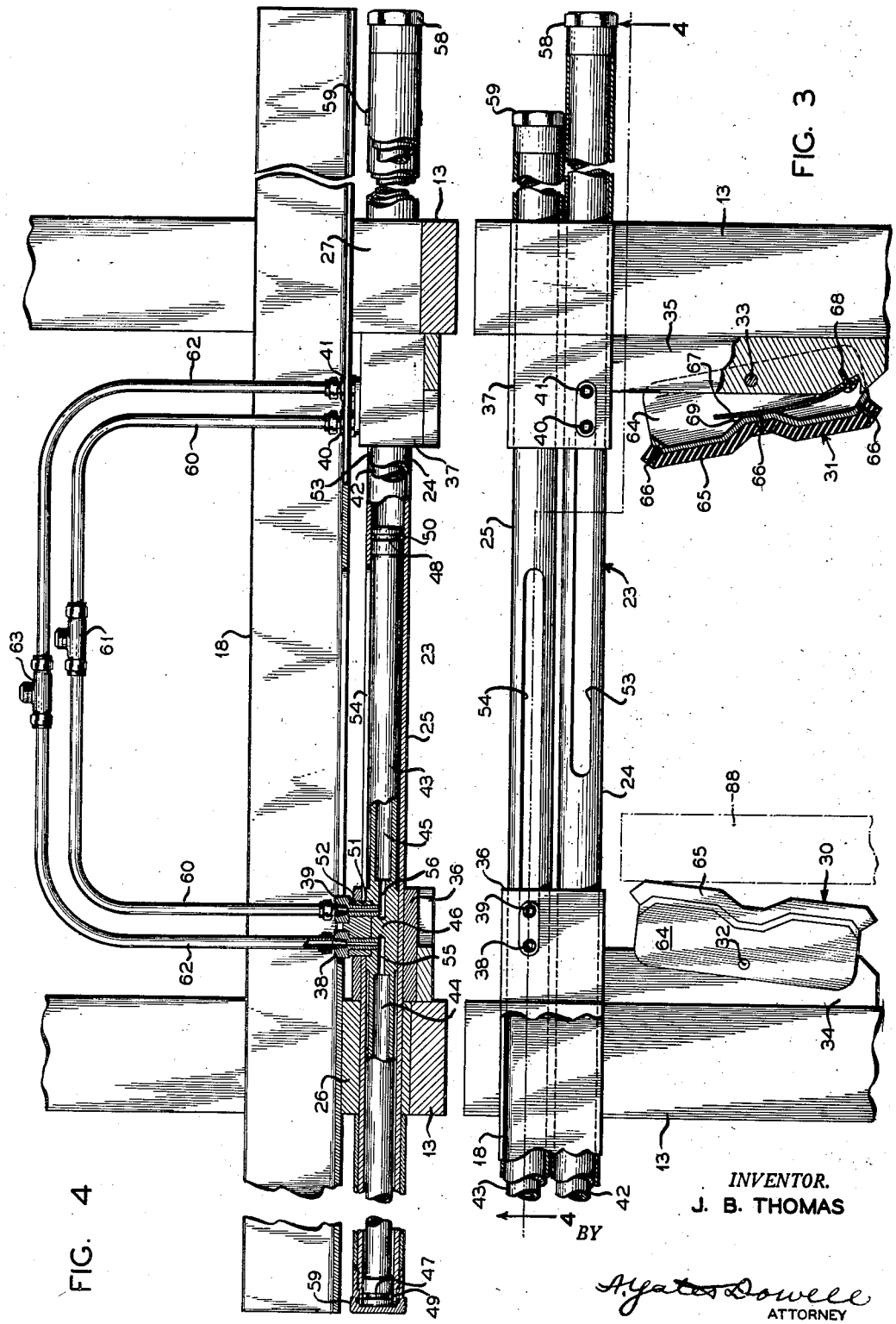
INVENTOR.
J. B. THOMAS
BY
A. Yates Dowell
ATTORNEY Oct. 20, 1953 J. B. THOMAS 2,656,062
PALLET GRIPPING DEVICE
Filed March 28, 1950 3 Sheets-Sheet 3

INVENTOR.
J. B. THOMAS
BY
*A. Yates Dowell*
ATTORNEY

Patented Oct. 20, 1953

2,656,062

UNITED STATES PATENT OFFICE 2,656,062

PALLET GRIPPING DEVICE

Julian B. Thomas, Fort Worth, Tex.

Application March 28, 1950, Serial No. 152,357

11 Claims. (Cl. 214—514)

This invention relates to material and article handling and more particularly to a pallet gripper for retaining a load carrying pallet on an industrial truck while the load is removed therefrom.

Heretofore numerous devices for retaining a pallet in position on an industrial truck have been proposed but many of these have provided no means for automatically centering the device with relation to the pallet thus requiring extremely accurate and careful manipulation by the operator and others have required rather extensive modifications of the pallet structure including the provision of teeth thereon to be engaged by jaws on the truck.

It is therefore an object of this invention to provide a pallet gripper of economical construction which is designed to utilize a source of hydraulic power already provided on an industrial truck or a separate source of power provided for the purpose of actuating the gripper.

It is a further object of the invention to provide a pallet gripping device for application to an industrial truck having a pallet stack unloader thereon and which is designed to grip and hold the pallet against movement relative to the truck while the load or stack is removed therefrom.

It is a further object of the invention to provide a pallet gripping means which will automatically grip the pallet even though the same is appreciably out of alignment with the pallet engaging means carried by a conventional industrial truck.

It is a further object of the invention to provide a pallet gripping means for application to a conventional industrial truck in conjunction with a pallet stack unloader in which the unloader and gripping means may be conveniently operated from a common source of hydraulic or pneumatic power and in which operation of the pallet gripper is of necessity initiated prior to operation of the stack unloader.

It is a further object of the invention to provide a pallet gripper of relatively simple and economical construction in which the parts requiring accurate machine work have been held to a minimum and which will automatically accommodate for irregularities in the pallet and misalignment thereof with an industrial truck to which the pallet gripper is attached.

Further objects and advantages of the present invention will be apparent from the following specification taken in conjunction with the accompanying drawings, wherein:

Fig. 1 is a view in perspective showing the pallet gripper of this invention and a pallet stack unloader attached to a conventional industrial fork truck; the latter being shown in phantom.

Figure 6:
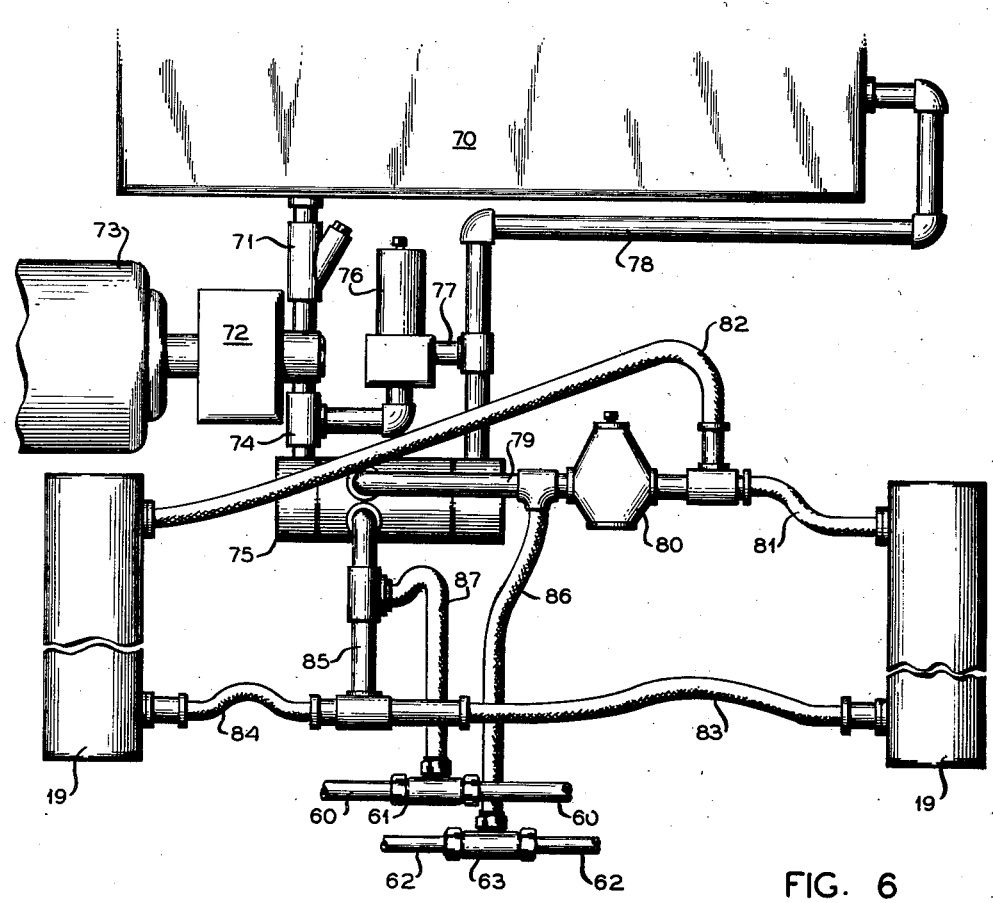
Figure 5:
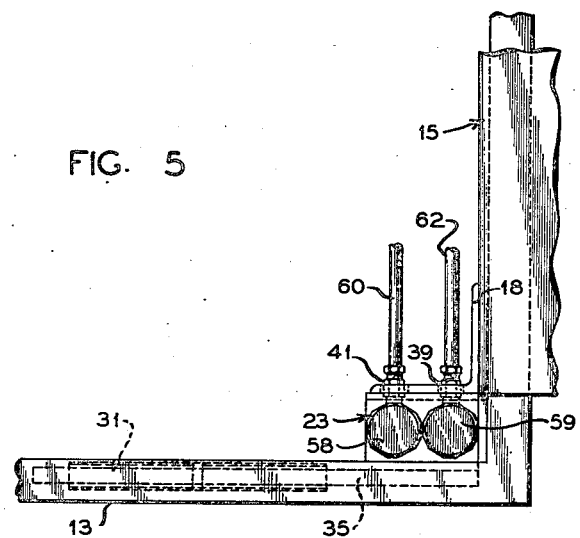

Fig. 2, a view in perspective of the pallet gripper apart from the truck to which it is normally applied;

Fig. 3, a fragmentary plan view with parts in section for greater clarity showing the pallet gripper of this invention attached to a conventional industrial truck;

Fig. 4, a sectional view on the line 4—4 of Fig. 3 of the pallet gripper forming this invention and showing the device applied to a conventional industrial truck;

Fig. 5, a fragmentary side elevational view showing the pallet gripper applied to a conventional industrial truck; and Fig. 6, a diagrammatic view of the hydraulic power circuit utilized in connection with a pallet stack unloaded and the pallet gripper of this invention.

With continued reference to the drawing there is shown in Fig. 1 a conventional industrial fork truck 10 having ground engaging wheels 11 and steering mechanism 12. Truck 10 is provided with the conventional pallet or load engaging fork arms 13 which may be secured to an elevating mechanism 14 for raising and lowering a load carried by the arms 13.

Since it is frequently desirable to unload the merchandise carried by a pallet as a single unit the truck 10 is also provided with a pusher mechanism indicated generally at 15 and since this pusher mechanism comprises no part of the instant invention the structure thereof will only be briefly described. Uprights 16 connected by cross bars 17 and 18 are secured to the elevating mechanism 14 and move upwardly and downwardly with the load carrying arms 13. Secured to the uprights 15 are operating cylinders 19 which may receive hydraulic or pneumatic power from a source provided on the truck 10 or from a separate motor driven pump mounted on the pusher mechanism 15. Pistons 20 are slidably received in cylinders 19 and these pistons connect with a linkage mechanism 21 which is secured to a grille-like load engaging pusher member 22. Movement of the pistons 20 outwardly of the cylinders 19 serves to move the pusher member 22 forwardly and eject a load carried by a pallet supported on the arms 13 or a load directly carried by the arms 13. Movement of the pistons 20 inwardly of the cylinders 19 retracts the load engaging member 22 to a collapsed position whereby the arms 13 may engage a pallet or a load over substantially the entire length thereof since the space occupied by the pusher mechanism 15 when in collapsed condition is substantially negligible.

It has been found in practice that it is frequently necessary to provide some means for retaining a load carrying pallet on the arms 13 when the load is ejected from the pallet since if such holding mechanism were not employed very often the pallet as well as the load is removed from the truck. For this purpose a pallet gripping mechanism indicated generally at 23 is secured to the arms 13 or elevating mechanism 14 in any suitable manner. As best shown in Fig. 2 the pallet gripping mechanism 23 comprises a pair of cylinders 24 and 25 which are substantially coextensive and are disposed in parallel relationship, cylinders 24 and 25 being secured together adjacent their ends by blocks 26 and 27, these blocks being provided with screw threaded apertures or the like 28 and 29 to facilitate attachment of the pusher mechanism 23 to the arms 13 or elevating mechanism 14. Obviously, any desired method of attachment may be employed, it only being necessary that the pusher mechanism 23 be rigidly secured in place and that any relative movement between cylinders 24 and 25 be prevented.

Pallet gripping shoes 30 and 31 are pivotally mounted by screw threaded fastening means or the like 32 and 33 on forwardly extending arms 34 and 35 which in turn are secured to blocks 36 and 37, slidably received on the cylinders 24 and 25. Block 36 is provided with fluid pressure connection nipples 38 and 39 and block 37 is provided with fluid pressure connection nipples 40 and 41.

The specific structural details of the pusher mechanism 23 are best shown in Figs. 3 and 4, there being a doubled ended piston 42 slidably disposed on cylinder 24 and an identical piston 43 slidably disposed in cylinder 25. As best shown in Fig. 4 piston 43 is provided with a bore 44 at the left-hand end thereof and a bore 45 at the right-hand end, these bores terminating short of the longitudinal center of the piston in order to form a dividing wall 46. Bores 44 and 45 are open at each end of the piston and adjacent each end there is provided grooves 47 and 48 for receiving sealing rings 49 and 50 of any desired character. Sealing rings 49 and 50 engage the inner wall of the cylinder 25 and serve to prevent leakage of pressure fluid between the piston 43 and the wall of the cylinder.

Partition 46 is provided with a recess 51 for receiving a block 52 which projects through and is slidably received in a slot 54 provided in the wall of the cylinder 25. A similar slot 53 is provided in the wall of the cylinder 24. Partition 46 is also provided with bores 55 and 56 communicating with the bores 44 and 45, respectively, in each end of the piston 43. The block 51 is secured in position by threaded nipples 38 and 39, these nipples being received in apertures in the block 52 and threadedly engaging apertures in the partition 46. Nipples 38 and 39, respectively, provide means for introducing and relieving fluid pressure in the bores 44 and 45 and consequently in each end of the cylinder 25. Block 52 also serves to secure the block 36 to the piston 43 thereby preventing relative movement therebetween and causing the block 36, arm 34 and pallet engaging shoe 30 to move therewith upon movement of the piston 43 in either direction. The cylinder 24 is closed at each end by caps 58 and the cylinder 25 by caps 59. The nipples 38 and 41 are connected by a flexible conduit 60 provided with a T-fitting 61 for connection to a control valve and source of fluid pressure. Likewise nipples 39 and 40 are connected by a flexible conduit 62 provided with a T-fitting 63 to be connected to a control valve and source of fluid pressure. In certain installations it may be desirable to introduce fluid pressure to the cylinders 24 and 25 at each end thereof in which case suitable fittings to receive the conduits 60 and 62 would be provided on the caps 58 and 59.

The pallet gripping shoes 30 and 31 as best shown in Fig. 3 each comprise a channel shaped body 64 received over arms 34 and 35 pivotally secured thereto by a screw threaded fastening means or the like 32 and 33, the body 64 being covered on the gripping face thereof with a cushioning element 65 of rubber or other suitable material. Element 65 may be secured to the body 64 by screw threaded fastening means or the like 66 or if desired may be bonded thereto by any well-known process. The gripping shoes 30 and 31 are normally biased to the position shown at the right in Fig. 3 by a spring or other equivalent means 67 secured to the arm 35 by screw threaded fastening means or the like 68, spring 67 normally bearing against a flat surface 69 on the interior of the body 64. The biased position of pallet gripping shoes 30 and 31 facilitates the engagement thereof with the pallet particularly when the pallet and truck 10 are somewhat out of alignment.

Since it is desirable that the pallet gripping means of this invention operate in conjunction with and timed relation to the pusher means 15 there is shown diagrammatically in Fig. 6 a fluid pressure circuit whereby such operation may be accomplished. A fluid reservoir 70 may be provided on the truck 10 or any other desirable location, reservoir 70 being connected through a strainer or other suitable filter 71 with a fluid pressure pump 72 driven by a motor 73. Pump 72 is connected through a suitable fitting 74 with a solenoid operated control valve 75. Also connected to fitting 74 is a relief valve 76 with the outlet 77 thereof connected to a return conduit 78 discharging into the reservoir 70. The relief valve 76 is provided as a safety measure in order to relieve any excessive pressures which may develop in the system. Upon actuation of the solenoid valve 75 to operate the pusher 15 fluid pressure flows through conduit 79 to a sequential bypass valve 80 and thereafter through conduits 81 and 82 to the pusher operating cylinders 19. The opposite ends of cylinders 19 are connected through conduits 83 and 84 to a conduit 85 also connected to solenoid valve 75. During the unloading operation of the pusher 15 conduits 83, 84 and 85 serve as discharge lines for the cylinders 19, the fluid therein flowing through the valve 75 and conduit 78 to reservoir 70.

Conduit 79 leading from valve 75 is connected to the sequential by-pass valve 80 and a conduit 86 which in turn is connected to T-fitting 63 and flexible conduit 62 leading to the pistons 42 and 43 disposed in cylinders 24 and 25. Conduit 85 is connected through a conduit 87 with T-fitting 61 and flexible conduit 60 which is also connected to pistons 42 and 43 disposed in cylinders 24 and 25. While the valve 75 has been described as solenoid operated, obviously if desired, this valve could be operated manually or by any other suitable mechanism.

In operation since it is desirable that the pallet gripping means 23 securely engage the load carrying pallet prior to operation of the pusher mechanism 15 means has been provided in the form of the sequential by-pass valve 80 to insure that such sequential or timed operation takes place. Upon actuation of the solenoid valve 75 to introduce fluid pressure from pump 72 to conduit 79 this fluid is prevented from flowing to conduits 81 and 82 communicating with pusher operating cylinders 19 by the sequential bypass valve 80 until sufficient pressure has built up in the conduit 79 to operate and open bypass valve 80. Consequently the initial fluid pressure will be conducted through conduit 86, T-fitting 63 and conduit 62. From conduit 62 the fluid flows through bores 55 and bores 44 in pistons 42 and 43 thus urging these pistons, blocks 36 and 37, arms 34 and 35 and pallet engaging shoes 30 and 31 carried thereby inwardly toward each other to grip a portion of the pallet or other object therebetween. The flow of fluid through conduit 86 will continue until the pallet gripping shoes 30 and 31 have engaged the pallet with sufficient force to hold the same, this action resulting in an increased pressure in the conduit 79 and upon this pressure reaching a predetermined value the sequential bypass valve 80 will open and permit the flow of fluid to conduits 81 and 82 and pusher operating cylinders 19 whereupon the pusher mechanism 15 will be operated to move the load from the pallet. Upon completion of the unloading operation the solenoid valve 75 is operated to introduce fluid pressure through conduit 85 to conduits 83 and 84 and pusher cylinders 19, thus retracting the pusher mechanism. At the same time this fluid pressure will flow through conduit 87, T-fitting 61 and conduit 60 to the opposite ends of gripper operating pistons 42 and 43 to move the pallet gripping shoes 30 and 31 away from each other and release the pallet.

In the operation of industrial fork trucks it requires considerable skill on the part of the operator to accurately align the pallet engaging forks or arms with the pallet and this difficulty is materially increased where it is necessary to accurately align pallet gripping jaws with cooperating means on the pallet and consequently the pallet gripping structure above described has been designed to automatically center itself with relation to the pallet and to grip the same even though the truck and the pallet are considerably out of alignment.

The operation of the pallet gripping mechanism to grip a cooperating portion of a pallet positioned considerably to one side of the center line between the pallet gripping shoes 30 and 31 is best shown in Fig. 3 in which there is disclosed in phantom at 88 a longitudinal reinforcing member normally provided on the underside of a load carrying pallet centrally thereof. As shown in Fig. 3, member 88 is positioned closely adjacent the lefthand pallet gripping shoe 30 with the righthand gripping shoe 31 considerably spaced therefrom. Upon the application of fluid pressure to the pistons 42 and 43 to move the pallet gripping shoes toward each other the piston 43 carrying pallet gripping shoe 30 will move toward the right as viewed in Fig. 3 until it contacts member 88 at which time movement of the gripping shoe 30 toward the right will cease and gripping shoe 31 will continue to move toward the left until it engages and grips the member 88. This action is due to the fact that the fluid pressure which actuates pistons 42 and 43 to provide a gripping action is carried thereto from a common source and since in accordance with the well known law that fluid pressure in a closed space will be transmitted with equal intensity in all directions the gripping shoes 30 and 31 will automatically center themselves with relation to the member 88. It is, therefore, only necessary for the operator of the truck to position the same in such a manner that the arms 13 will engage beneath the pallet to be raised and upon actuation of the proper controls the pallet gripping shoes automatically grip the pallet and at the same time compensate for any misalignment between the truck and the pallet.

It will be seen that by the above invention there has been provided a relatively inexpensive and highly efficient pallet gripping mechanism which may be conveniently applied to conventional fork trucks without material modification thereof and which may operate in conjunction with a load pusher installed thereon, the power for operating the pusher and gripping means being supplied either from a source on the truck or from a self-contained pressure producing unit.

It will be obvious to those skilled in the art that various changes may be made in this invention without departing from the spirit and scope thereof and therefore this invention is not limited by that which is shown in the drawing or described in the specification but only as indicated in the appended claims.

What is claimed is:

1. For use with an industrial fork truck for transporting load carrying pallets and having a fluid pressure operated pallet unloader, a pallet gripping device comprising spaced parallel cylinders secured to said truck, a double ended hollow piston slidably disposed in each cylinder, each piston having a partition at substantially the midpoint thereof, a flexible fluid pressure conduit connecting the hollow outer ends of each piston, a second flexible fluid pressure conduit connecting the hollow inner ends of each piston, right and lefthand blocks slidably mounted on said cylinders, said righthand block being secured to one piston for movement therewith, said lefthand block being secured to the other piston for movement therewith, right and lefthand pallet gripping shoes pivotally carried by said blocks, means to bias said shoes in one direction and a fluid pressure source and control means connected to said unloader and said flexible conduits whereby upon actuation of said control means said gripping shoes will move toward each other to grip said pallet and automatically compensate for any misalignment between said pallet and said truck and thereafter said unloader will operate to remove the load from the pallet.

2. For use with an industrial fork truck for transporting load carrying pallets and having a fluid pressure operated pallet unloader, a pallet gripping device comprising spaced parallel cylinders secured to said truck, a double ended hollow piston slidably disposed in each cylinder, each piston having a partition therein, a flexible fluid pressure conduit connecting the hollow outer ends of each piston, a second flexible fluid pressure conduit connecting the hollow inner ends of each piston, right and lefthand blocks slidably mounted on said cylinders, said righthand block being secured to one piston for movement therewith, said lefthand block being secured to the other piston for movement therewith, right and lefthand pallet gripping shoes pivotally carried by said blocks, means to bias said shoes in one direction and a fluid pressure source and control means connected to said unloader and said flexible conduits whereby upon actuation of said control means said gripping shoes will move toward each other to grip said pallet and automatically compensate for any misalignment between said pallet and said truck and thereafter said unloader will operate to remove the load from the pallet.

3. For use with an industrial fork truck for transporting load carrying pallets and having a fluid pressure operated pallet unloader, a pallet gripping device comprising spaced parallel cylinders secured to said truck, a double ended hollow piston slidably disposed in each cylinder, each piston having a partition therein, a flexible fluid pressure conduit connecting the hollow outer ends of each piston, a second flexible pressure fluid conduit connecting the hollow inner ends of each piston, means connected to each piston and carrying right and lefthand pallet gripping shoes, means to bias said shoes in one direction and a fluid pressure source and control means connected to said unloader and said flexible conduits whereby upon actuation of said control means said gripping shoes will move toward each other to grip said pallet and automatically compensate for any misalignment between said pallet and said truck and thereafter said unloader will operate to remove the load from the pallet.

4. For use with an industrial fork truck for transporting load carrying pallets and having a fluid pressure operated pallet unloader, a pallet gripping device comprising cylinders secured to said truck, a double ended hollow piston slidably disposed in each cylinder, each piston having a partition therein, a flexible fluid pressure conduit connecting the hollow outer ends of each piston, a second flexible fluid pressure conduit connecting the hollow inner ends of each piston, means secured to each piston and carrying pallet gripping shoes and a fluid pressure source and control means connected to said unloader and said flexible conduits whereby upon actuation of said control means said gripping shoes will move toward each other to grip said pallet and automatically compensate for any misalignment between said pallet and said truck and thereafter said unloader will operate to remove the load from the pallet.

5. A gripping device comprising spaced parallel cylinders, a double ended hollow piston slidably disposed in each cylinder, each piston having a partition at substantially the midpoint thereof, a flexible fluid pressure conduit connecting the hollow outer ends of each piston, a second fluid pressure conduit connecting the hollow inner ends of each piston, right and lefthand blocks slidably mounted on said cylinders, said righthand block being secured to one piston for movement therewith from an outer position to an inner position beyond the mid-point of the associated cylinder, said lefthand block being secured to the other piston for movement therewith from an outer position to an inner position beyond the mid-point of the associated cylinder, right and lefthand gripping shoes pivotally carried by said blocks, means to bias said shoes in one direction, a fluid pressure source and control means connected to said flexible conduits whereby upon actuation of said control means said gripping shoes will move toward each other and automatically compensate for any misalignment between said gripping device and an object to be gripped by said shoes.

6. A gripping device comprising spaced parallel cylinders, a double ended hollow piston slidably disposed in each cylinder, each piston having a partition at substantially the midpoint thereof, a flexible fluid pressure conduit connecting the hollow outer ends of each piston, a second flexible fluid pressure conduit connecting the hollow inner ends of each piston, right and lefthand blocks slidably mounted on said cylinders, said righthand block being secured to one piston for movement therewith from an outer position to an inner position beyond the mid-point of the associated cylinder, said lefthand block being secured to the other piston for movement therewith from an outer position to an inner position beyond the mid-point of the associated cylinder, right and lefthand gripping shoes carried by said blocks and a fluid pressure source and control means connected to said flexible conduits whereby upon actuation of said control means said gripping shoes will move toward each other and compensate for any misalignment between said gripping device and an object to be gripped by said shoes.

7. A gripping device comprising a pair of cylinders a double ended hollow piston slidably disposed in each cylinder, each piston having a partition therein, a flexible fluid pressure conduit connecting the hollow outer ends of each piston, a second flexible fluid pressure conduit connecting the hollow inner ends of each piston, means secured to each piston and carrying gripping shoes and a fluid pressure source and control means connected to said flexible conduits whereby on actuation of said control means said gripping shoes will move toward each other and automatically compensate for any misalignment between said gripping device and an object to be gripped by said shoes, either of said shoes being movable inwardly beyond the mid-point of the associated cylinder to engage and grip a relatively small object positioned to one side of center.

8. A gripping device comprising a pair of cylinders, a double ended hollow piston slidably disposed in each cylinder, each piston having a partition therein, a fluid pressure conduit connecting the hollow outer ends of each piston, a second fluid pressure conduit connecting the hollow inner ends of each piston, a gripping shoe carried by each piston and a fluid pressure source and control means connected to said flexible conduits whereby upon actuation of said control means said gripping shoes will move toward each other and automatically compensate for any misalignment between said device and an object to be gripped by said shoes, either of said shoes being movable inwardly beyond the mid-point of the associated cylinder to engage and grip a relatively small object positioned to one side of center.

9. A gripping device comprising a pair of cylinders, a double ended hollow piston slidably disposed in each cylinder, each piston having a partition therein, a fluid pressure conduit connecting the hollow outer ends of each piston, a second fluid pressure conduit connecting the hollow inner ends of each piston and a gripping shoe carried by each piston whereby upon the application of fluid pressure to said first conduit said shoes will move toward each other to grip an object and automatically compensate for any misalignment therebetween and said device and upon application of fluid pressure to said second conduit said shoes will move away from each other to release said object, either of said shoes being movable inwardly beyond the mid-point of the associated cylinder to engage and grip a relatively small object positioned to one side of center.

10. A gripping device comprising a pair of cylinders, a double ended piston slidably disposed in each cylinder, a fluid pressure conduit connecting the opposite outer ends of each cylinder, a second fluid pressure conduit connecting the other opposite outer ends of each cylinder, means secured to each piston and carrying gripping shoes and a fluid pressure source and control means connected to said conduits whereby on actuation of said control means said gripping shoes will move toward each other and automatically compensate for any misalignment between said gripping device and an object to be gripped by said shoes, either of said shoes being movable inwardly beyond the mid-point of the associated cylinder to engage and grip a relatively small object positioned to one side of center.

11. A gripping device comprising a pair of cylinders, a double ended piston slidably disposed in each cylinder, a fluid pressure conduit connecting the opposite outer ends of each cylinder, a second fluid pressure conduit connecting the other opposite outer ends of each cylinder and a gripping shoe carried by each piston whereby upon the application of fluid pressure to said first conduit said shoes will move toward each other to grip an object and automatically compensate for misalignment therebetween and said device and upon application of fluid pressure to said second conduit said shoes will move away from each other to release said object, either of said shoes being movable inwardly beyond the mid-point of the associated cylinder to engage and grip a relatively small object positioned to one side of center.

JULIAN B. THOMAS.

References Cited in the file of this patent

UNITED STATES PATENTS

| Number | Name | Date |
|---|---|---|
| 2,178,369 | Dunham | Oct. 31, 1939 |
| 2,256,454 | Bomar | Sept. 16, 1941 |
| 2,299,430 | Sexton | Oct. 20, 1942 |
| 2,370,528 | Fontaine | Feb. 27, 1945 |
| 2,371,661 | Wilms | Mar. 20, 1945 |
| 2,390,293 | Colson | Dec. 4, 1945 |
| 2,403,356 | Francis | July 2, 1946 |
| 2,461,877 | Brereton | Feb. 15, 1949 |
| 2,497,118 | Ferrario et al. | Feb. 14, 1950 |
| 2,508,564 | Cardwell et al. | May 23, 1950 |
| 2,538,505 | Carter | Jan. 16, 1951 |
| 2,571,550 | Ehmann | Oct. 16, 1951 |